US012391030B2

(12) United States Patent
Newell et al.

(10) Patent No.: US 12,391,030 B2
(45) Date of Patent: Aug. 19, 2025

(54) HIGH-SPEED IN-LINE COLD LAMINATING UNIT

(71) Applicant: ACCO BRANDS CORPORATION, Lake Zurich, IL (US)

(72) Inventors: James R. Newell, Vernon Hills, IL (US); Peter J. Lee, McHenry, IL (US); Benjamin R. Anderson, Buffalo Grove, IL (US); Peter D. Hotkowski, Chester, CT (US)

(73) Assignee: ACCO BRANDS CORPORATION, Lake Zurich, IL (US)

( * ) Notice: Subject to any disclaimer, the term of this patent is extended or adjusted under 35 U.S.C. 154(b) by 185 days.

(21) Appl. No.: 18/309,573

(22) Filed: Apr. 28, 2023

(65) Prior Publication Data
US 2024/0359449 A1 Oct. 31, 2024

(51) Int. Cl.
*B32B 37/00* (2006.01)
*B32B 37/10* (2006.01)
(Continued)

(52) U.S. Cl.
CPC .......... *B32B 37/0053* (2013.01); *B32B 37/10* (2013.01); *B32B 38/0004* (2013.01);
(Continued)

(58) Field of Classification Search
CPC ................................................. B32B 37/0053
See application file for complete search history.

(56) References Cited

U.S. PATENT DOCUMENTS 3,453,165 A * 7/1969 Isbey et al. ............... G03F 1/92
156/235
4,780,742 A 10/1988 Takahashi et al.
(Continued)

FOREIGN PATENT DOCUMENTS

CN 101304862 B 10/2012
CN 202934920 U 5/2013
(Continued)

OTHER PUBLICATIONS

Nguyen, "Plasticity-Induced Bending of Aluminum-Polymer Layered Composites", University of Pittsburgh, Swanson School of Engineering, dated Apr. 7, 2023 (55 pages).
(Continued)

*Primary Examiner* — Jeffry H Aftergut
(74) *Attorney, Agent, or Firm* — Michael Best & Friedrich LLP

(57) ABSTRACT

A high-speed, cold laminating system includes a lamination unit for inline use connected with a paper feeder supplying at least 30 ppm. The lamination unit further includes a set of unheated motor-driven laminating pressure rollers along a laminating path, and a cutter between the rollers and an exit. A diverter gate passes the paper sheets to the laminating path or to the exit without passing along the laminating path. The system includes a controller to control the motor, the diverter gate, and functions of the lamination unit. The controller is programmed to control the motor to pause the pressure rollers with a leading sheet therein while a subsequent sheet moves toward the pressure rollers so a laminated spacing distance between a trailing edge of the leading sheet and a leading edge of the subsequent sheet to equal a prescribed spacing distance.

10 Claims, 13 Drawing Sheets

(51) Int. Cl.
  *B32B 38/00* (2006.01)
  *B32B 41/00* (2006.01)
(52) U.S. Cl.
  CPC ...... *B32B 41/00* (2013.01); *B32B 2037/0061* (2013.01); *B32B 2309/14* (2013.01); *B32B 2317/12* (2013.01)

(56) References Cited

U.S. PATENT DOCUMENTS

| | | |
|---|---|---|
| 5,210,581 A | 5/1993 | Kuzuya |
| 5,368,677 A | 11/1994 | Ueda et al. |
| 6,585,366 B2 | 7/2003 | Nagata et al. |
| 6,663,238 B2 | 12/2003 | Kikuchi et al. |
| 6,854,903 B2 | 2/2005 | Wiechers et al. |
| 6,860,201 B2 | 3/2005 | Guillen et al. |
| 6,915,740 B2 | 7/2005 | Pozuelo et al. |
| 6,942,331 B2 | 9/2005 | Guillen et al. |
| 7,005,030 B2 | 2/2006 | Van Heeswijk et al. |
| 7,600,934 B2 | 10/2009 | Guillen et al. |
| 7,638,012 B2 | 12/2009 | Galles et al. |
| 7,771,553 B2 | 8/2010 | Lemens et al. |
| 8,778,108 B2 | 7/2014 | Sato et al. |
| 8,800,626 B2 | 8/2014 | Foley, Sr. et al. |
| 9,579,815 B2 | 2/2017 | Newell et al. |
| 10,183,473 B2 | 1/2019 | Bar |
| 10,744,794 B2 | 8/2020 | Shigeta et al. |
| 10,875,285 B2 | 12/2020 | Kitzmiller et al. |
| 11,001,028 B2 | 5/2021 | Mark et al. |
| 2003/0079827 A1 | 5/2003 | Kerr et al. |
| 2004/0221947 A1 | 11/2004 | Haldner et al. |
| 2007/0102104 A1 | 5/2007 | Galles et al. |
| 2008/0099123 A1 | 5/2008 | Lemens et al. |
| 2008/0236728 A1 | 10/2008 | Meier et al. |
| 2016/0187834 A1 | 6/2016 | Matsuno |
| 2019/0083999 A1 | 3/2019 | Shigeta |
| 2021/0405571 A1 | 12/2021 | Nozaki et al. |
| 2022/0011697 A1 | 1/2022 | Kimura |
| 2022/0118756 A1 | 4/2022 | Francisco |
| 2022/0281709 A1 | 9/2022 | Amdahl et al. |
| 2024/0326397 A1 | 10/2024 | Jinichi et al. |
| 2024/0359449 A1 | 10/2024 | Newell et al. |

FOREIGN PATENT DOCUMENTS

| | | |
|---|---|---|
| CN | 102555405 B | 9/2015 |
| CN | 110871621 A | 3/2020 |
| CN | 108883646 B | 10/2020 |
| CN | 211641369 U | 10/2020 |
| CN | 114379255 A | 4/2022 |
| CN | 216733518 U | 6/2022 |
| CN | 119659156 A | 3/2025 |
| CN | 119734536 A | 4/2025 |
| DE | 102015221664 B4 | 1/2019 |
| EP | 2022631 A2 | 2/2009 |
| EP | 1948414 B1 | 8/2014 |
| EP | 2463097 B1 | 3/2015 |
| EP | 3459726 B1 | 8/2020 |
| EP | 3695967 B1 | 1/2022 |
| EP | 3984741 A1 | 4/2022 |
| EP | 3441231 B1 | 2/2023 |
| JP | 2006350069 A | 12/2006 |
| JP | 2009069273 A | 4/2009 |
| JP | 5796807 B2 * | 8/2015 |
| JP | 6619504 B2 | 12/2019 |
| JP | 7638524 B2 | 3/2025 |
| WO | 2007016973 A1 | 2/2007 |
| WO | 2024089112 A1 | 5/2024 |

OTHER PUBLICATIONS

European Patent Office. Extended European Search Report for Application No. 23216486.3, dated May 24, 2024 (5 pages).

* cited by examiner

HIGH-SPEED IN-LINE COLD LAMINATING UNIT

BACKGROUND

The present invention relates to lamination of sheet media, for example paper sheets from a printer, between two transparent adhesive-coated films.

SUMMARY

In one aspect, the present disclose provides a high-speed cold laminating system including a lamination unit configured for inline use connected with a paper feeder. The lamination unit has an entrance configured to receive multiple individual paper sheets provided in a continuous stream from the paper feeder at a page rate of at least 30 pages per minute. The lamination unit further includes an exit, a set of unheated laminating pressure rollers along a laminating path between the entrance and the exit, and a cutter between the set of laminating pressure rollers and the exit. The system also includes a motor to drive rotation of the set of laminating pressure rollers. The system also includes a diverter gate that passes sheets of the plurality of individual paper sheets to the laminating path or to the exit without passing along the laminating path. The system includes a controller to control the motor, the diverter gate, and a plurality of functions of the lamination unit. The controller is programmed to control the motor to pause the set of pressure rollers with a leading sheet of the plurality of individual paper sheets therein while a subsequent sheet of the plurality of individual paper sheets is conveyed along the laminating path toward the set of laminating pressure rollers. This allows a laminated spacing distance between a trailing edge of the leading sheet and a leading edge of the subsequent sheet to be equal to a prescribed spacing distance.

In another aspect, the present disclose provides a high-speed cold laminating system including a paper feeder operable to output individual paper sheets at a page rate of at least 30 pages per minute. The system also includes a lamination unit connected in-line with an outlet of the paper feeder to receive the individual paper sheets at the page rate of the paper feeder. The lamination unit includes a set of unheated laminating pressure rollers, a steering module upstream of the set of laminating pressure rollers, and a cutter downstream of the set of laminating pressure rollers. The steering module positions and orients each individual paper sheet with respect to a directional path through the lamination unit. The lamination unit further includes a laminating film cartridge receptacle with a replaceable laminating film cartridge and a motor for driving the paper sheets through the laminating film cartridge for lamination with pressure-sensitive film. The laminating film cartridge is insertable into the laminating film cartridge receptacle through a wall of the lamination unit along an insertion axis that is perpendicular to the directional path and parallel to an axis of a film roll of the laminating film cartridge. The wall includes a cutout shaped and sized for passage of the laminating film cartridge. The wall further includes an adjacent slot in aligned with the set of laminating pressure rollers and a tapered guide to direct a film tail of the laminating film cartridge into the slot and between the set of laminating pressure rollers.

In another aspect, the present disclose provides high-speed cold laminating system including a laminating film cartridge having two rolls of pressure-sensitive laminating film. The laminating film cartridge receivable into a cartridge receptacle of the laminating system. The system further includes a steering module upstream of the set of laminating pressure rollers and a cutter downstream of the set of laminating pressure rollers. The steering module and operable to orients and positions individual paper sheets with respect to a directional path. The cutter severs a length of the laminating film containing an individual paper sheet from the remaining laminating film on the rolls. The system includes a controller to control the conveyance of individual paper sheets through the laminating system and programmed for bi-directional communication with an EEPROM of the laminating film cartridge. The EEPROM provides information to the controller regarding the laminating film, and the controller tracks laminating film consumption within the laminating system. The controller is further programmed to periodically update the EEPROM of the laminating film cartridge with a current remaining film length during use within the laminating system based on the laminating film consumption tracked by the controller.

Other aspects of the invention will become apparent by consideration of the detailed description and accompanying drawings.

DETAILED DESCRIPTION OF THE DRAWINGS

Figure 1:
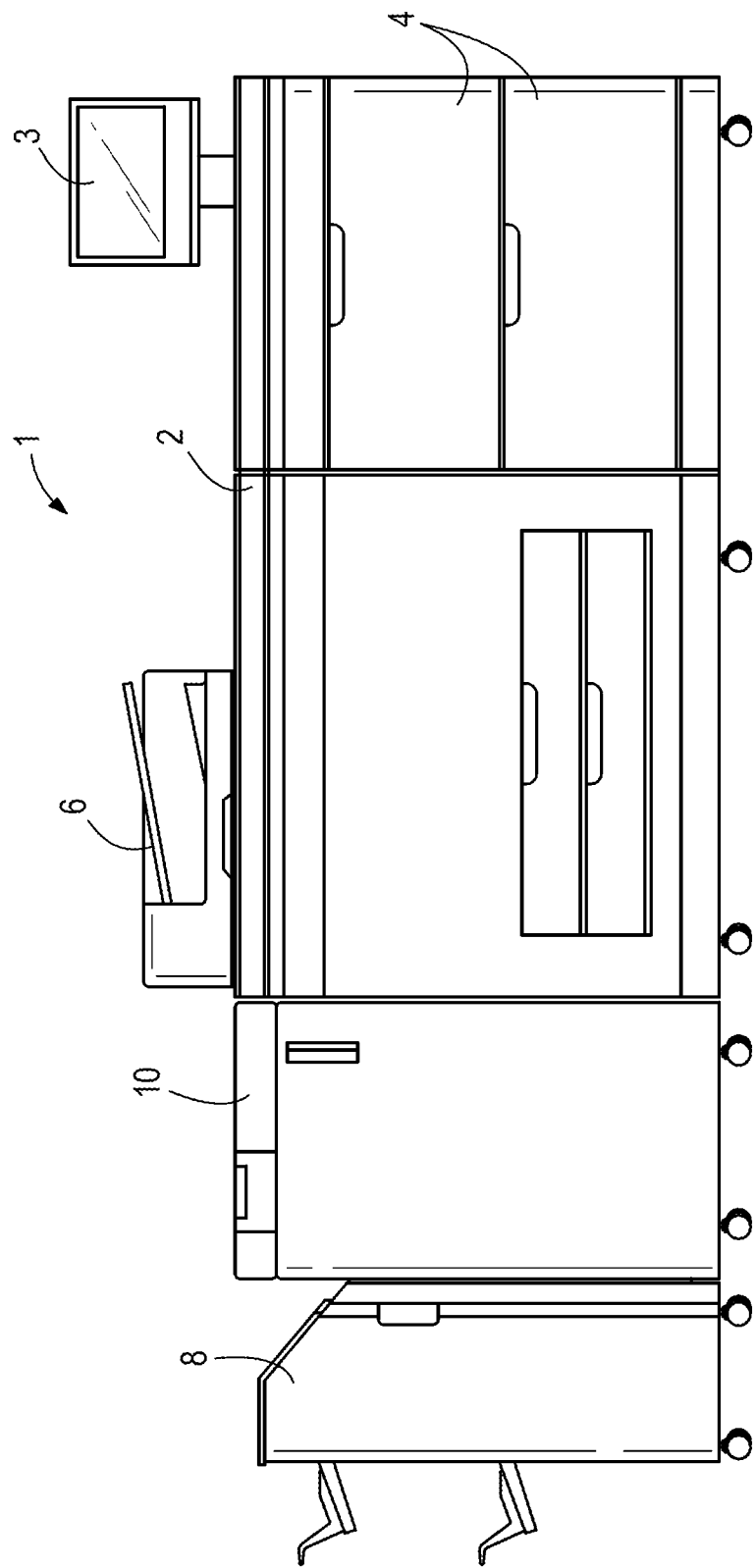
FIG. 1 is a partial perspective view of a printing system including an in-line lamination unit according to one construction of the invention.

With reference to FIG. 1, a printing system 1 includes a lamination unit 10 coupled to a printing device 2. As described in further detail below, the printing device 2 acts as an automatic paper feeder, and the lamination unit 10 may process a continuous stream of individual paper sheets from the printing device 2 while maintaining a page rate set by the printing device 2. The printing system 1 further includes a first controller 3, one or a plurality of material input receptacles 4, a photocopier or scanner 6, and a material output 8. The material input receptacles 4 contain a plurality of material varying in dimension and type (e.g., paper styles and color). The first controller 3 can be configured to control at least some aspects of all devices of the printing system 1, as well as optionally communicating with additional dedicated device controllers. The first controller 3 operably connects to the printing device 2 to control the material released by the material input receptacle 4 to be printed. The printing device 2 can be connected to an information network to receive various print jobs or tasks, although the printing device 2 may have alternate means for receiving data corresponding to print jobs. The printing system 1 may include a variety of devices coupled to the printing device 2 for post-processing (e.g., hole puncher, cutter, laminator, labeler). The devices, including the lamination unit 10, couple to the material output 8. One example of an in-line hole puncher is provided in applicant's prior U.S. Pat. No. 9,579,815, the entire contents of which are incorporated by reference herein. As an in-line connected post-processing device, the lamination unit 10 obviates the need for transporting, buffering, or loading sheets from the printer to be laminated. Rather, the sheets for a particular job are automatically processed and continuously fed from the printing device 2 to the lamination unit 10, and then arrive for pickup at the material output 8 of the printing system 1. The material output 8 may receive printed sheets that are not laminated, printed sheets that are laminated, and printed sheets that are processed in at least one additional in-line connected post-processing device (not shown).

In the in-line printing system 1 as illustrated, the printing device 2 is configured to selectively feed paper sheets into the lamination unit 10, which is incapable of receiving sheets to be laminated from another source. However, in other embodiments, the printing system 1 is provided with an additional separate paper feeder, referred to as an interposer, connected upstream of the lamination unit 10 to provide paper to the system. The interposer is a device added after the printing device 2 to allow paper sheets to be sent direct to the lamination unit 10 without traveling through the printing device 2. In yet other embodiments, the lamination unit 10 can be configured for standalone use (without the printing device 2) and can be fed by an automated feeder of any suitable construction.

The printing system 1 including the lamination unit 10 and optionally additional in-line devices constitutes a continuous sequence of devices connected along a single workflow, with certain decision controls to determine the path that each sheet travels. The in-line printing system 1 embodies a production line of various devices, each operable to modify sheets processed therethrough. Each device can also be configured to include a bypass pathway where sheets may not receive any modifications, but rather exit the device in the same form in which they entered. In practice, many sheets may be printed by the printing device 2 and passed through the rest of the printing system 1 unchanged from the printing device 2.

FIGS. 2-7 illustrate the lamination unit 10 in further detail. The lamination unit 10 is a device operable to laminate sheets of paper or other material as the material passes through the lamination unit 10. The lamination unit 10 may be used with and couple to a variety of upstream devices, such as the printing device 2 of the printing system 1 of FIG. 1, to laminate a sequence of automatically fed sheets by bonding each sheet between two plies of transparent or translucent film. As noted below, the lamination unit 10 is also configured to separate laminated sheets from each other so that individual laminated products are output.

Figure 2:
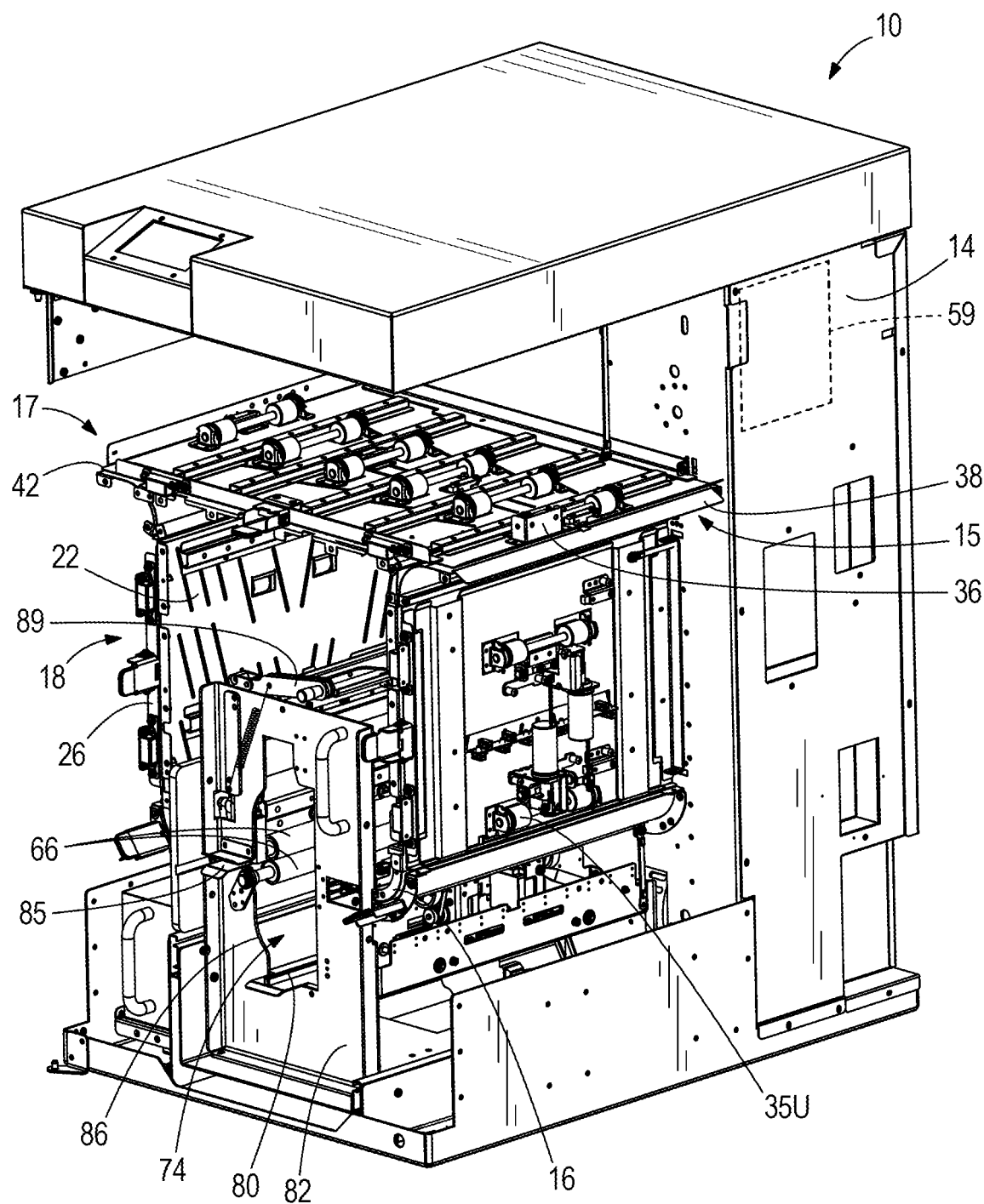
FIG. 2 is a partial perspective view of the lamination unit of FIG. 1.
Figure 3:
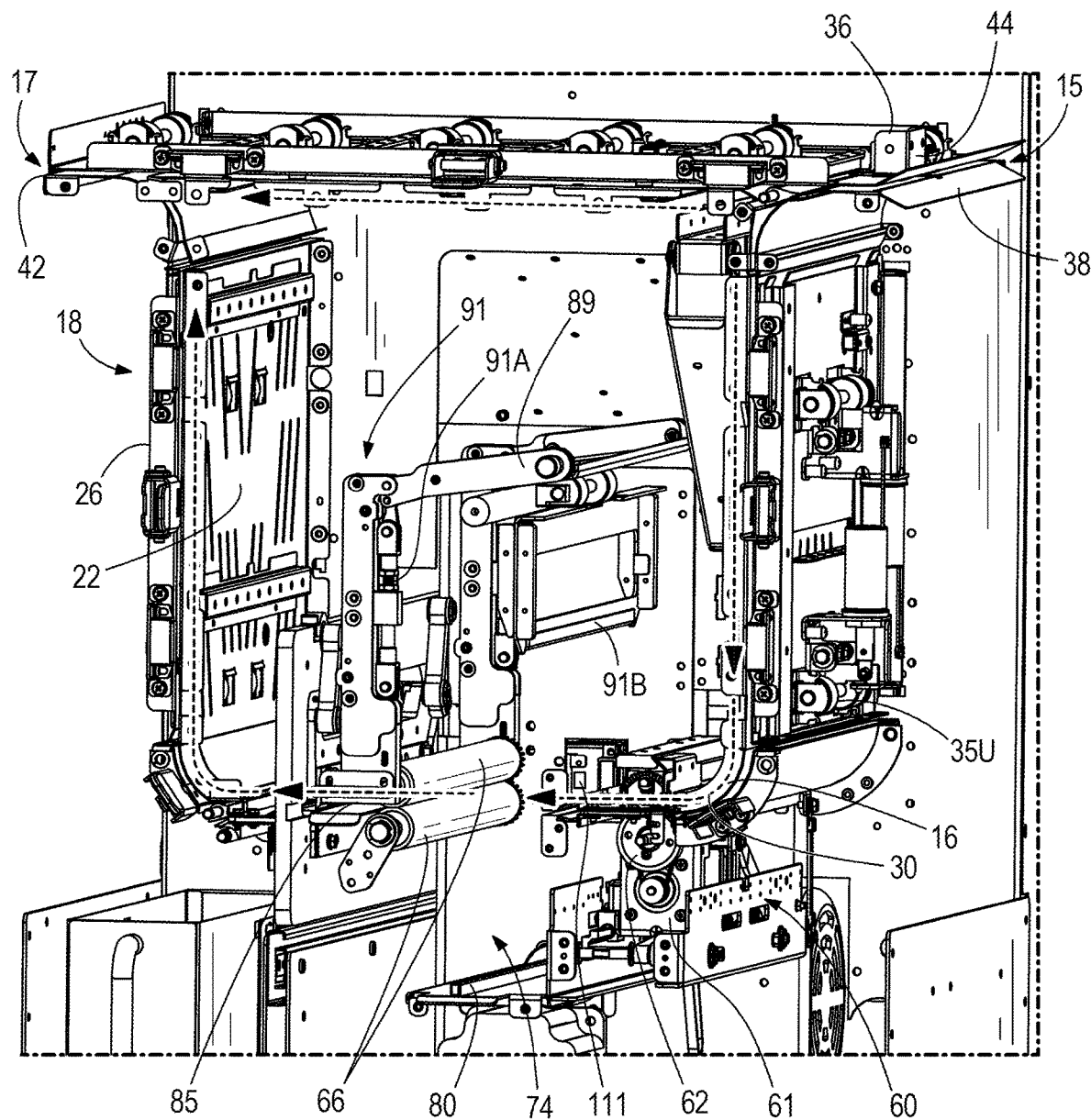
FIG. 3 is a perspective view of a portion of a guide member of the lamination unit of FIG. 2, illustrating first, second, and third trailing edge sensor elements.

With reference to FIGS. 2 and 3, the lamination unit 10 includes an entrance 15 configured to receive a plurality of individual paper sheets provided in a continuous stream from the printing device 2 (or other paper feeder) at a high-speed page rate. The page rate can be set by the printing device 2, without special consideration for the lamination unit 10. In particular, the page rate output by the printing device 2 can be the same whether the sheets of the job are to be laminated in the lamination unit 10 or not. The page rate can be at least 30 pages per minute. In some constructions, the lamination unit 10 can operate at a page rate of at least 90 pages per minute. In some constructions, the lamination unit 10 can operate at a page rate of at least 140 pages per minute. Page rate is the number of sheets of letter (US) or A4 size processed per minute. However, the lamination unit 10 is not limited to these particular sheet sizes and can operate on sheets of other sizes, including but not limited to 11-inch×17-inch sheets or size A3 sheets. In some constructions, the lamination unit 10 can operate on banner length sheets, up to and including 1300 mm length. The lamination unit 10 further includes a laminating path 16 between the entrance 15 and an exit 17 of the lamination unit 10, and the page rates mentioned above can be achieved through the laminating path 16. Along the laminating path 16, the lamination line speed may vary in certain portions, including speeding up, slowing down, or even briefly pausing, while keeping the page rate at the exit 17 to be equal to the page rate at the entrance 15. All sheets passing through the lamination unit 10, whether laminated or not, leave the lamination unit 10 via the same exit 17. In other constructions, the lamination unit 10 can have multiple exits or output trays. Downstream of the lamination unit 10, sheets may take a plurality of different paths before reaching the material output 8 of the printing system 1.

The printing system 1 continuously operates with a consistent page rate within each station or device of the printing system 1. This obviates the need for buffering or stacking up sheets between tasks. As such, the overall page rate of the lamination unit 10 matches that of the printing device 2 when connected in-line with no immediate buffer. Despite this, the sheets may be laminated at a page rate lower than, or higher than, the overall page rate as measured at the entrance 15 and the exit 17, as will be explained in further detail below.

With reference to FIG. 2, the lamination unit 10 includes a housing 14 that at least partially surrounds a guide member 18. The illustrated guide member 18 is a U-shaped guide member 18, although other constructions include different shapes and sizes than the illustrated. With reference to FIGS. 2 and 3, the guide member 18 includes a first U-shaped member 22 and a second U-shaped member 26 that together define the laminating path 16 therebetween. The guide member 18 includes multiple sets of rollers that guide one or more sheets through the guide member 18 along a direction of travel as illustrated by the arrows in FIG. 3. The sets of rollers includes an acceleration roller 35U operable to accelerate or decelerate each of the sheets to a designated speed between the entrance 15 and the point where lamination occurs. The upstream acceleration roller 35U ensures continuous flow, which allows gaps between material. Particularly, a sheet may be accelerated from the entrance 15 to a speed in excess of the speed corresponding to the overall page rate. This enables a subsequent deceleration and possible pause during lamination, followed by a re-acceleration between the point of lamination and the exit 17 (e.g., by a downstream acceleration roller 35D) up to the speed corresponding to the page rate of sheet supply to the lamination unit 10.

The guide member 18 includes a diverter gate 36 operable between a first position that passes sheets of the plurality of individual paper sheets to the laminating path 16, and a second position that passes sheets of the plurality of individual paper sheets to the exit 17 without passing along the laminating path 16 (i.e., avoiding lamination of those sheets). The diverter gate 36 can be solenoid-operated in some constructions.

The guide member 18 further includes a material receiving portion 38 and a material discharge portion 42 disposed at upper ends of the U-shaped guide member 18. The material receiving portion 38 receives the one or more sheets of paper (e.g., from a printer or other device), and the material discharge portion 42 discharges the one or more sheets of paper (e.g., into a tray or other storage medium, or to another post-processing device, such as a cutting and/or binding machine) after the one or more sheets of paper have been moved through the laminating path 16. While the illustrated construction illustrates a particular direction of travel (i.e., moving right to left through a U-shaped path), in other constructions the direction of travel may be different from that illustrated.

The material receiving portion 38 further includes a path entry sensor 44 to sense the material length thus determine the material size. The path entry sensor 44 is configured to send the material size to the lamination unit 10.

As material passes through the lamination unit 10, its overall throughout matches the output page rate of the printer can maintain its normal or full speed. However, the speed of a sheet need not remain constant throughout the lamination unit 10. If desired to slow down at one point, the sheet must accelerate elsewhere. To ensure continuous flow, the acceleration rollers 35U, 35D adjust the speed of material regardless of its initial speed entering the material receiving portion 38. In some constructions, this allows lamination to occur at a fixed page rate for a wide range of page rates as measured into/out of the lamination unit 10 (i.e., the page rate of the printing system 1).

Figure 7:
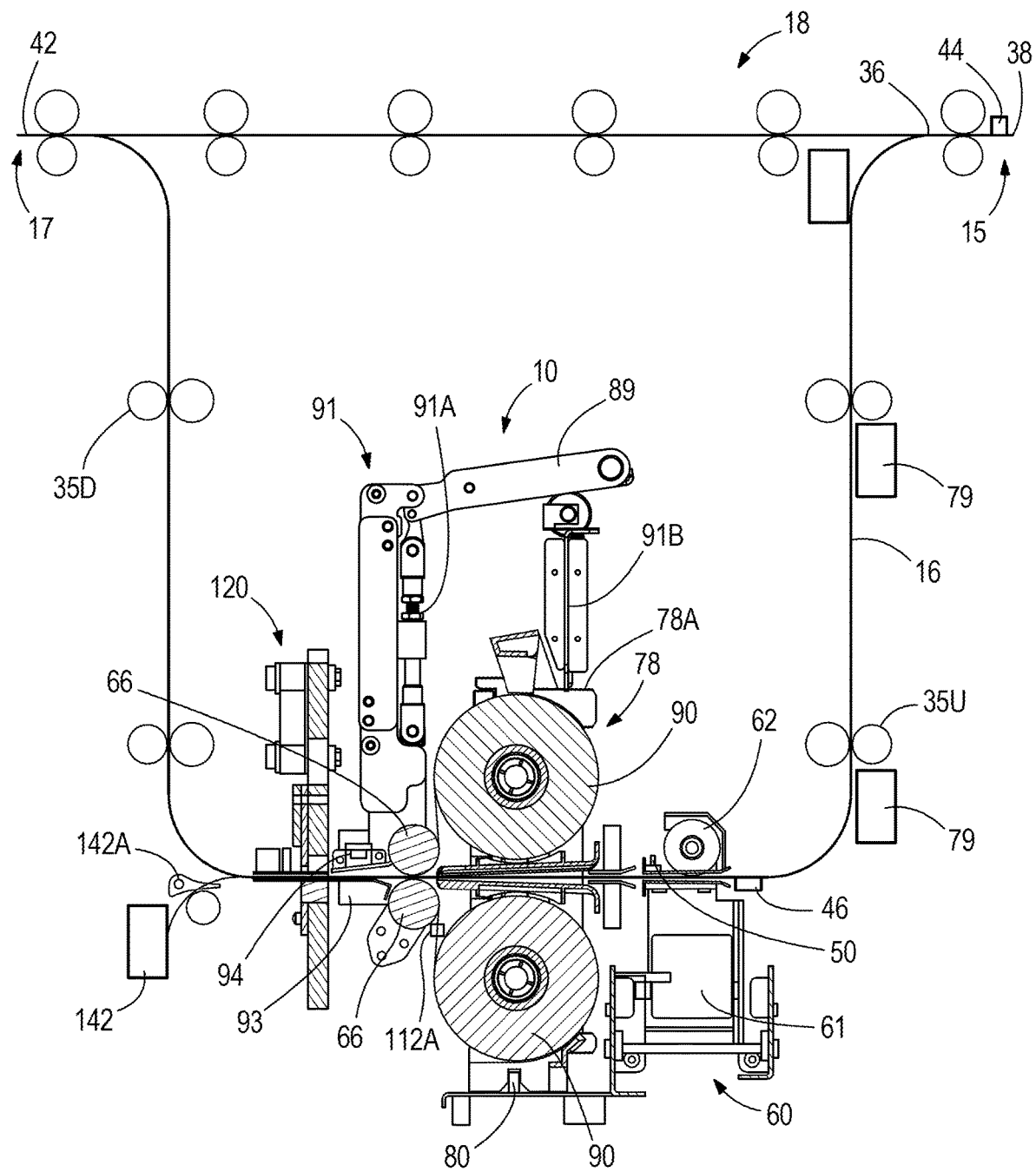
FIG. 7 is a partial front view of the lamination unit.

With reference to FIGS. 3 and 7, the lamination unit 10 includes an alignment sensor 46. The sensor 46 is disposed adjacent the laminating path 16 and detects a position of an edge of a sheet of paper that extends parallel with the direction of travel as the sheet of paper moves through the laminating path 16. Within the lamination unit 10, this is considered a side edge of the sheet, although it may be the "top" or "bottom" of a sheet (i.e., according to portrait orientation). The sensor 46 provides information to the lamination unit 10 to center the sheet. In particular, the sheet may be shifted in a direction perpendicular to the direction of travel. The sensor 46 can be a sensor unit or assembly that includes a row of sensors (e.g., two sensor elements) arranged perpendicular to the direction of travel.

With continued reference to FIGS. 3 and 7, the lamination unit 10 also includes a second alignment sensor, or particularly skew sensor 50. The skew sensor 50 is disposed adjacent the laminating path 16 and detects a leading edge of the sheet of paper as the sheet of paper moves through the laminating path 16. The angle of the leading edge can be determined from the sensor 50. The sensor 50 can be a sensor unit or assembly that includes a row of sensors (e.g., three or five sensor elements) arranged perpendicular to the direction of travel.

With reference to FIGS. 1 and 4-7, the lamination unit 10 includes a set of unheated laminating pressure rollers 66 along a laminating path 16 and a laminating film cartridge 78 (FIG. 3). The pressure rollers 66 are disposed generally at the bottom of the U-shaped guide member 18. The sensors 44, 46, and 50 are disposed between the entrance 15 and the pressure rollers 66, and one or more (e.g., a central sensor element of the skew sensor 50 alone) are used to detect positions of leading and/or trailing edges of different sheets of paper passing through the laminating path 16. Based at least in part on the sheet edge detection, the laminating pressure rollers 66 are controlled for selective activation to control stopping/starting of the lamination unit 10 to laminate the sheet material based on the detected positions of the leading and/or trailing edges. As illustrated, all of the sensors 44, 46, 50 are located upstream of the laminating film cartridge 78. The sensor(s) 44, 46, and 50 communicates with a lamination controller 59 of the lamination unit 10 (FIG. 1) such that the controller 59 can receive signals from the sensor(s) 44, 46, and 50, and communicate a signal to the lamination unit 10. The controller 59 of the lamination unit 10 is in operable communication with the first controller 3 of the printing system 1. The controller 59 is further operably connected to control a motor 61, the diverter gate 36, and a plurality of functions of the lamination unit 10, including those described in further detail below.

A steering module 60 of the lamination unit 10 is provided upstream of the pressure rollers 66 and cartridge 78. The steering module 60 includes the motor 61 and a plurality of independently-driven drive rollers 62 operably connected to the skew sensor 50. The steering module 60 is operable to orient and position each one of the individual sheets of paper with respect to a directional path through the lamination unit 10. The skew sensor 50 sends information to the controller 59 to adjust the speeds of the drive rollers 62 to eliminate the skew angle of the sheet. The leading edge of the sheet is positioned perpendicular to the direction of travel. The motor 61 is operably connected to the controller 59 to drive the drive rollers 62 based upon a control signal generated in the controller 59. Solenoid(s) 79 of one or more upstream sets of rollers can be actuated to release the grip of the rollers on the sheet in the event of a long sheet that is still resident at one or more upstream roller sets while being manipulated at the steering module 60.

With further reference to FIG. 7, the lamination unit 10 further includes a laminating film cartridge receptacle 74 along the laminating path 16 (FIG. 3). The laminating film cartridge receptacle 74 accommodates and receives the replaceable laminating film cartridge 78. As illustrated in FIGS. 4-7, a slide rail 80 projects into the laminating film cartridge receptacle 74 for engagement with the laminating film cartridge 78. The slide rail 80 extends perpendicular to the laminating path 16. As illustrated, the slide rail 80 is provided at the bottom of the cartridge receptacle 74 to engage corresponding channel(s) 109 in the laminating film cartridge 78 (FIGS. 8 and 12), although other positions are optional depending on the configuration of the laminating film cartridge 78. The film cartridge 78, which is described separately below, includes a supply of pressure-sensitive laminating film 90 for use at the laminating pressure rollers 66. The lamination unit 10 further includes a wall or access panel 82 with a cutout 86 to allow access to the cartridge 78. The cutout 86 is shaped and sized for passage of the laminating film cartridge 78. The shape of the cutout 86 is configured to the profile of the cartridge 78, such that all or most of the other portions of the lamination unit 10 are concealed by the panel 82. In some embodiments, the lamination unit 10 can be mounted slidably (e.g., on rails) within the cabinet or housing 14, and at least a portion of the lamination unit 10 can slide out from an operational position within the housing 14 to facilitate removal of the cartridge 78 for replacement.

The panel 82 also includes a slot 85 adjacent the cutout 86 in register with the set of laminating pressure rollers 66 for passage of a pre-sealed laminating film tail 87 of the laminating film cartridge 78 (i.e., where the films of the two rolls 90 are bonded together). The panel 82 further includes a tapered guide 88 configured to direct the film tail 87 into the slot 85 and between the set of laminating pressure rollers 66. The tapered guide 88 includes two flanges coupled to the panel 82 with a gap between to allow the film tail 87 to be guided through.

Figure 5:
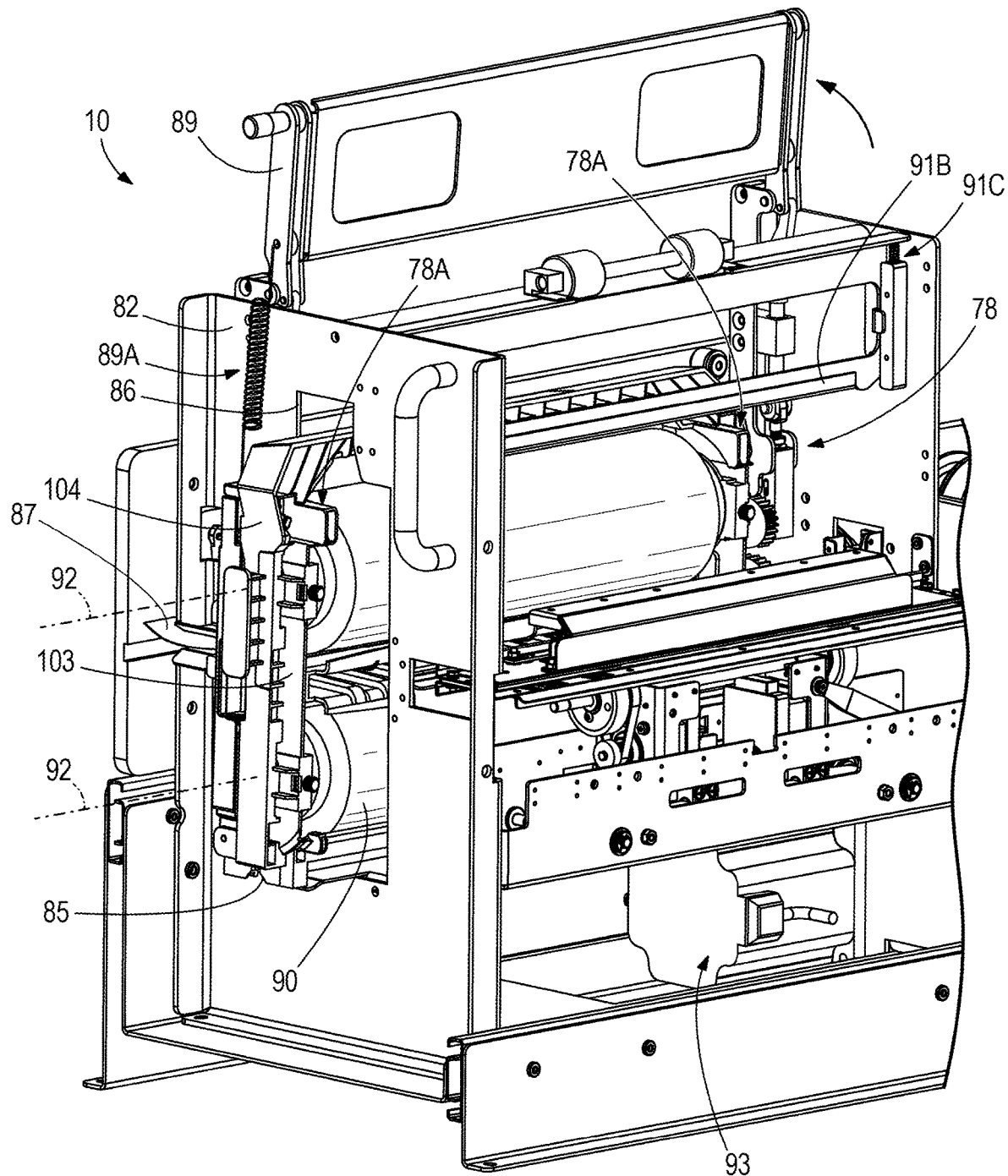
FIG. 5 is a perspective view of the lamination unit, the laminating film cartridge receptacle, and a replaceable laminating film cartridge sliding into the unit.
Figure 6:
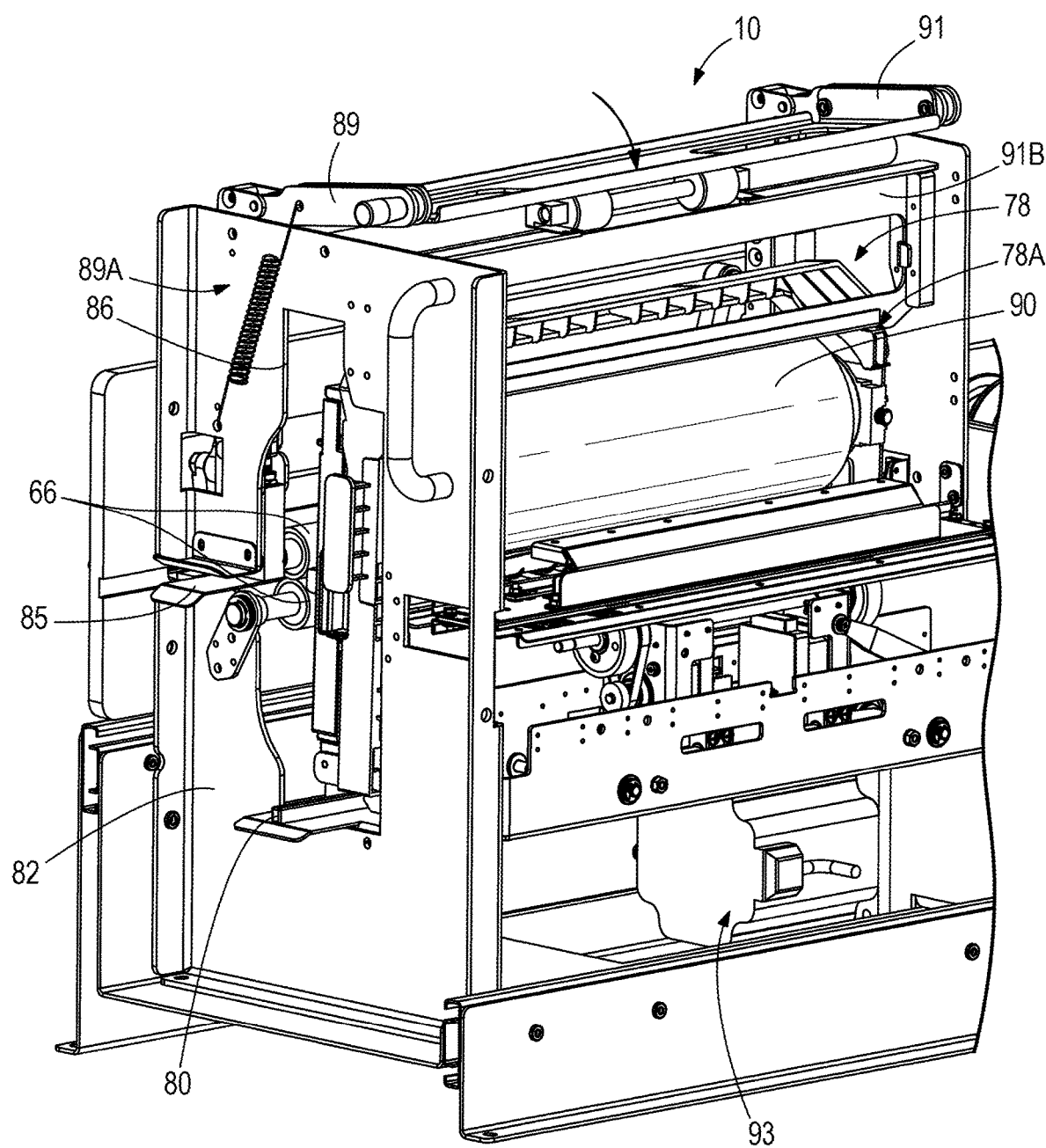
FIG. 6 is a perspective view of the lamination unit, the laminating film cartridge receptacle, and the replaceable laminating film cartridge in the unit.

A lever 89 is supported movable with respect to the panel 82. As shown in FIGS. 5 and 6, the lever 89 can be at least partially exposed and accessible above the panel 82. The lever 89 is coupled to a linkage 91 operable to close and open the pressure rollers 66. The linkage 91 can include an adjustable biasing device 91A (FIGS. 3 and 7) that sets the pressure applied between the laminating pressure rollers 66 when the linkage 91 is in the closed or operational laminating position. With reference to FIGS. 5 and 6, the cartridge 78 is enabled to be removed by moving the lever 89 from a closed or latching position to an open or unlatching position. For example, the linkage 91 operated by the lever 89 can include or actuate a link 91B that engages with one or more contact surfaces 78A of the cartridge 78 as shown in FIGS. 5-7 to retain the cartridge 78 whenever the lever is closed. The cartridge contact surfaces 78A can be configured to provide inter-engagement of complementary shaped features with the link 91B, or simply provide a frictional engagement therewith as shown. The lever 89 is operable with one release motion to release the laminating film cartridge 78 from a latched position and separate the set of laminating pressure rollers 66. With the pressure rollers 66 in the open or gapped position, the film tail 87 is unclamped from the laminating pressure rollers 66 for removal. Likewise, a user can use the tapered guide 88 to direct the film tail 87 of the new or refilled film cartridge 78 between the pressure rollers 66. Movement of the laminating film cartridge 78 out of or into the cartridge receptacle 74 is guided by engagement of the channel(s) 109 with the slide rail 80. Following the insertion of the cartridge 78, the lever 89 is operated back to the closed or latching position to secure the cartridge 78 into the operational position and clamp the film tail 87 between the laminating pressure rollers 66.

Figure 4:
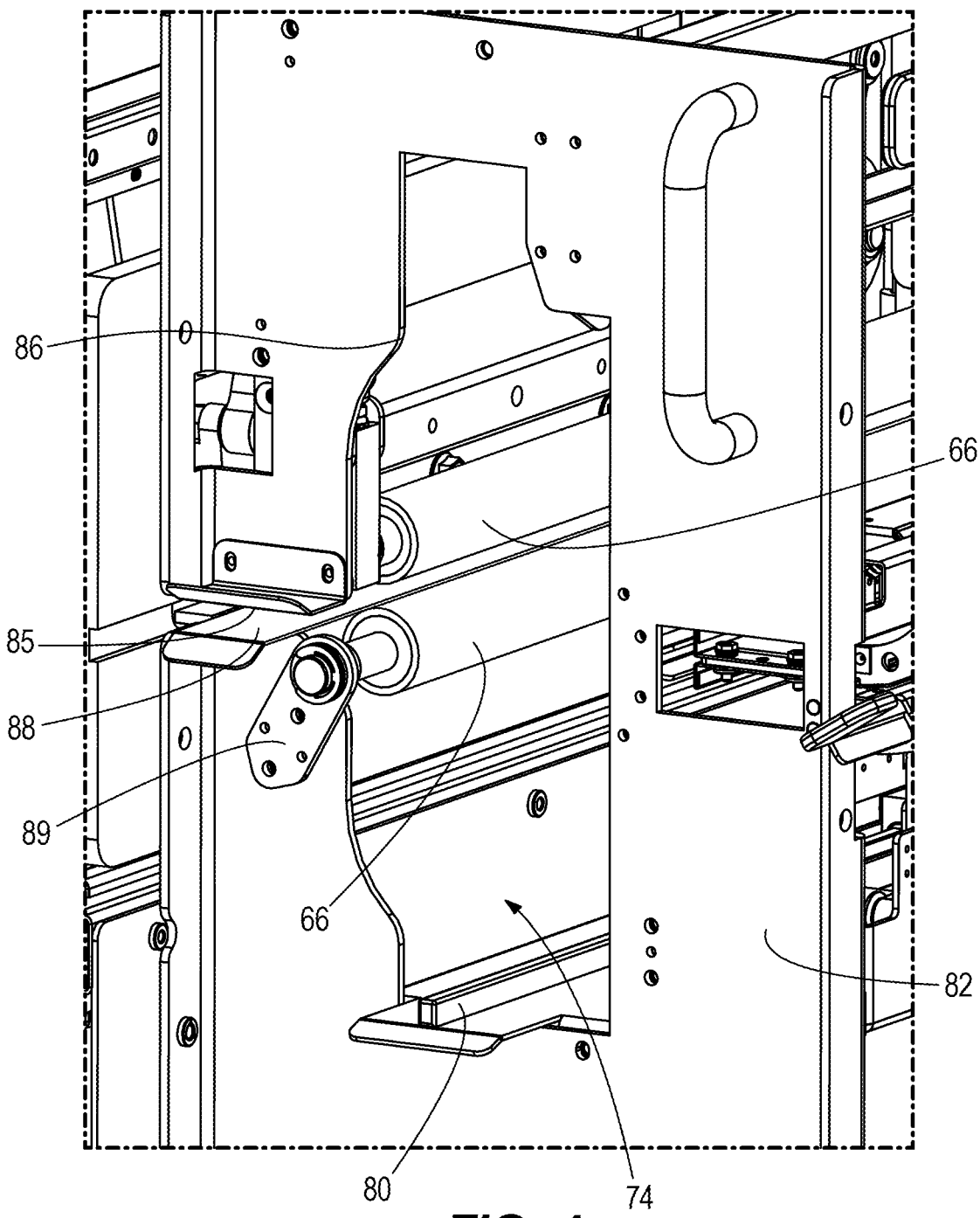
FIG. 4 is a is a perspective view of a side wall cutout of the lamination unit and a laminating film cartridge receptacle.

As shown in FIGS. 5 and 6, the lever 89 can be biased by a spring 89A (e.g., over-center tension spring). For example, the spring 89 extends between a first end secured on the lever 89 (which is operable by the user as the handle or input of the linkage 91), and a second end on the panel 82. Due to the over-center relationship of the spring 89A with respect to the pivot of the lever 89, the spring 89 can bias the lever to the two different limit positions, the open and closed positions, depending on the position of the lever 89. Closing the lever 89 enables the spring 89A to apply bias force in the closing or latching direction that actuates the link 91B from the upwardly-biased position of FIG. 5 to the downward position of FIG. 6. As shown, the link 91B can be provided in the form of a plate and can be upwardly-biased by one or more springs 91C that are provided at the outboard ends and arranged to bear against an angled portion of the link 91B. In the same closing motion, the lever 89 also drives the upper pressure roller 66 downward toward and against the lower pressure roller 66. The upper pressure roller 66 is driven by the adjustable biasing device 91A, which is length adjustable and includes a spring (not shown) that exerts downward force on a bearing block 91D that rotatably supports the upper pressure roller. The same mechanism is provided on both ends supporting the upper pressure roller 66. When the lever 89 is opened, spring pressure is relieved in the adjustable biasing device 91A, and the linkage 91 further pulls the upper pressure roller 66 away from the lower pressure roller 66 as shown in FIG. 4. In some constructions, the spring 89A is eliminated, and the lever 89 may be unbiased (i.e., biased by gravity alone).

Figure 8:
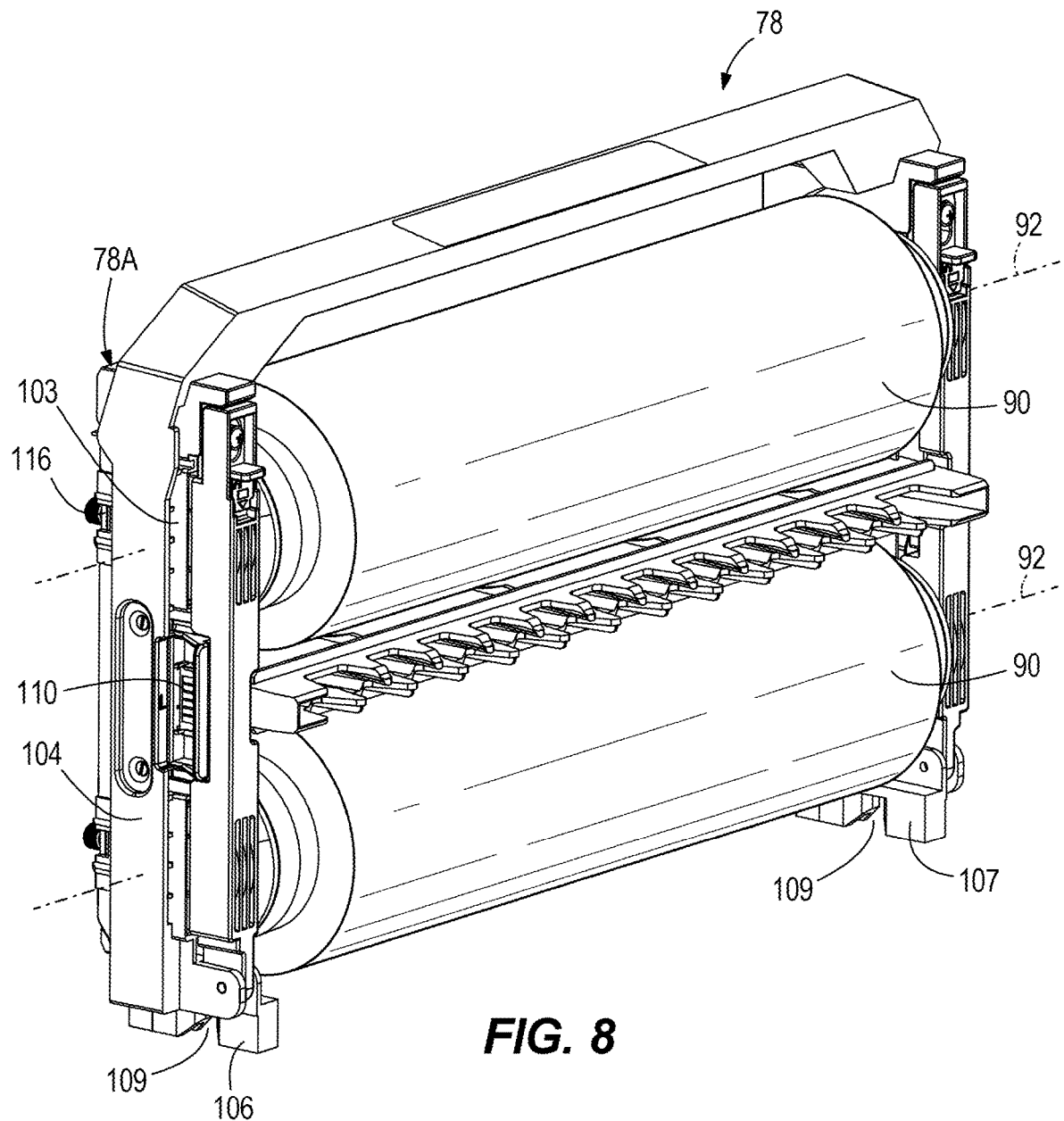
FIG. 8 is a perspective view of the replaceable laminating film cartridge.

With further reference to FIG. 8, the cartridge 78 includes a pair of rolls of pressure-sensitive laminating film 90 positioned along parallel spool axes 92. Each film roll includes a spool or core about which the laminating film 90 is wound to form the roll. The film of the first laminating film roll 90 is released on a top side of the laminating path traveled by the sheets, and the film of the second laminating film roll 90 is released on the bottom side. As shown in FIG. 7, the laminating film from the rolls 90 extends directly to the laminating pressure rollers 66 immediately downstream of the cartridge 78. Each sheet to be laminated passes through a gap at the center of the cartridge 78 between the film rolls 90 and is directed into a nip formed by the laminating pressure rollers 66. As shown, the cartridge 78 can include a tapered sheet guide. At the laminating pressure rollers 66, the sheet meets the adhesive-coated co-facing sides of the two laminating films. A laminating motor 93 is operably connected to the pressure rollers 66 to rotate them, which also pulls the required amount of film from the laminating film rolls 90. The laminating film from the two rolls 90 adhere together around the sheet thus laminating the sheet.

With further reference to FIGS. 7 and 10, a sheet sensor 94 tracks the movement of each sheet (by detection of leading and/or trailing edges) along the laminating path 16, downstream of the laminating nip formed by the rollers 66. The controller 59 is programmed to receive information from the sheet sensor 94 about the position of the sheet as it exits the laminating pressure rollers 66. The sheet sensor 94 can be used to detect the trailing edge of the laminated sheet, data upon which the controller 59 determines when to stop and cut a laminated product, for example, counting a prescribed number of steps of the motor 93 following detection of the trailing edge of the sheet, wherein the prescribed number of steps corresponds to the distance between the sheet sensor 94 and the cutting point established by a cutter assembly 120, plus a prescribed excess or border. In some constructions, the motor 93 can be controlled to stop for cutting based on other information, including detection of the trailing sheet edge further upstream (and a corresponding greater number of motor steps). Also, once sheet length is detected, by leading and trailing edges passing the path entry sensor 44 or the skew sensor 50, control of the motor 93 may be handled in relation to leading edge detection, plus the sheet length for a given sheet.

Figure 10A:
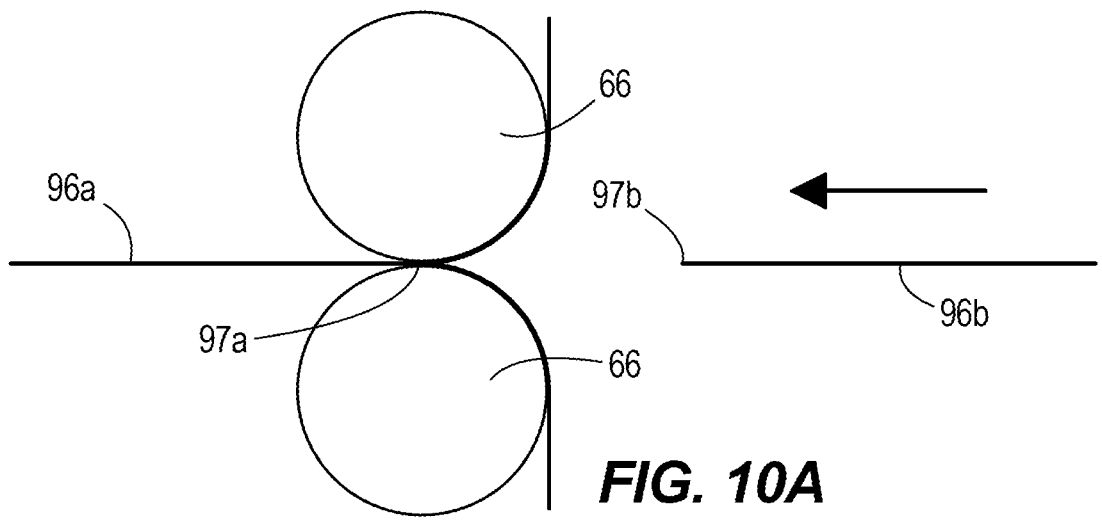
FIG. 10A is a schematic, side view of the set of pressure rollers with a leading sheet while a subsequent sheet is conveyed along the laminating path so that a laminated spacing distance between a trailing edge of the leading sheet and a leading edge of the subsequent sheet is equal to a prescribed spacing distance.
Figure 10B:
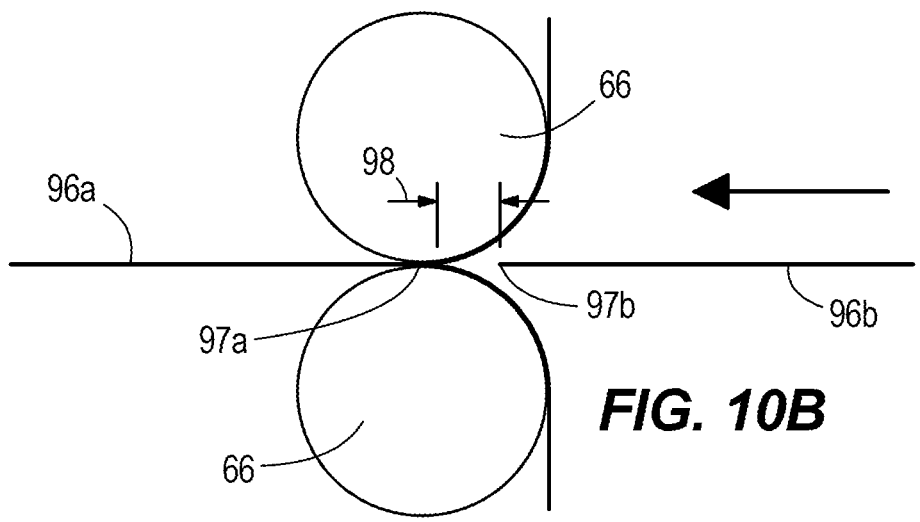
FIG. 10B is another schematic, side view of the set of pressure rollers with a leading sheet while a subsequent sheet is conveyed along the laminating path so that a laminated spacing distance between a trailing edge of the leading sheet and a leading edge of the subsequent sheet is equal to a prescribed spacing distance.
Figure 11:
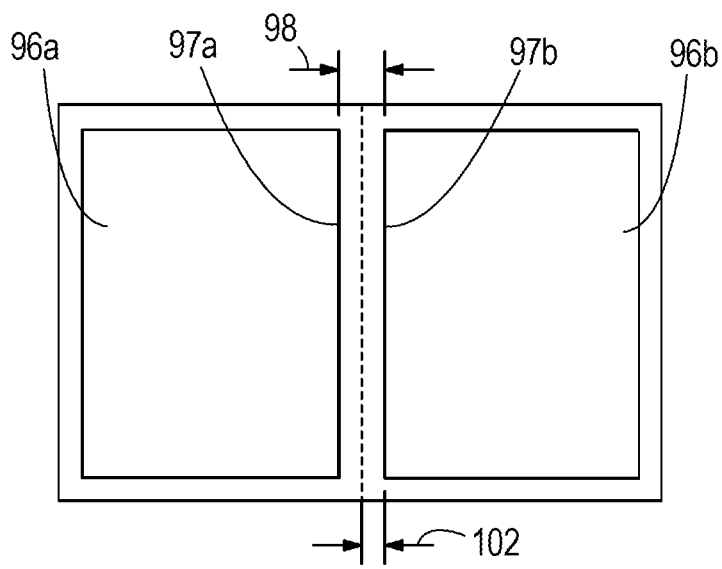
FIG. 11 is a top view of the leading and trailing sheets of FIGS. 10A, 10B laminated together by the pressure rollers.

FIGS. 10A and 10B present a detail schematic view of two sequential sheets 96a, 96b encountering the laminating pressure rollers 66, illustrating one optional feature for controlling sheet-to-sheet spacing prior to cutting laminated sheets apart. As described above, the laminating pressure rollers 66 rotate to pull the sheet through and bond it between the laminating film from the rolls 90. The controller 59 is programmed to control the motor 93, based on one or more detected sheet edges, to pause the set of pressure rollers 66 while a portion of the leading sheet 96a remains therein. For example, the controller 59 can direct stoppage of the motor 93 upon a prescribed number of motor steps following detection of the trailing edge 97a of the leading sheet 96a by the skew sensor 50 or another appropriate sheet sensor. The remaining sheet(s) along the laminating path 16 continue moving, so that the subsequent sheet 96b following the leading sheet 96a closes the sheet-to-sheet gap with the leading sheet 96a. Based on the position of a leading edge 97b of the subsequent sheet 96b in relation to the stopped trailing edge 97a of the leading sheet 96a (e.g., calculated by the controller 59 by counting steps of the upstream motor 61 of the steering module 60 that delivers the subsequent sheet 96b to the laminating pressure rollers 66), the controller 59 controls the motor 93 to restart the laminating pressure rollers 66 to set a laminated spacing distance 98 between the leading sheet trailing edge 97a and the subsequent sheet leading edge 97b equal to a prescribed spacing distance. The prescribed spacing distance 98 may be double a prescribed border 102 of the finished laminated product, as shown in FIG. 11. The border 102 represents the bonded laminating film beyond the respective sheet edges 97a, 97b. The prescribed border 102 may be automatically set or input to one of the system controllers 3, 59 by a user. While the illustrated construction illustrates a particular direction of travel (i.e., moving right to left), in other constructions the direction of travel may be different from that illustrated.

Figure 8A:
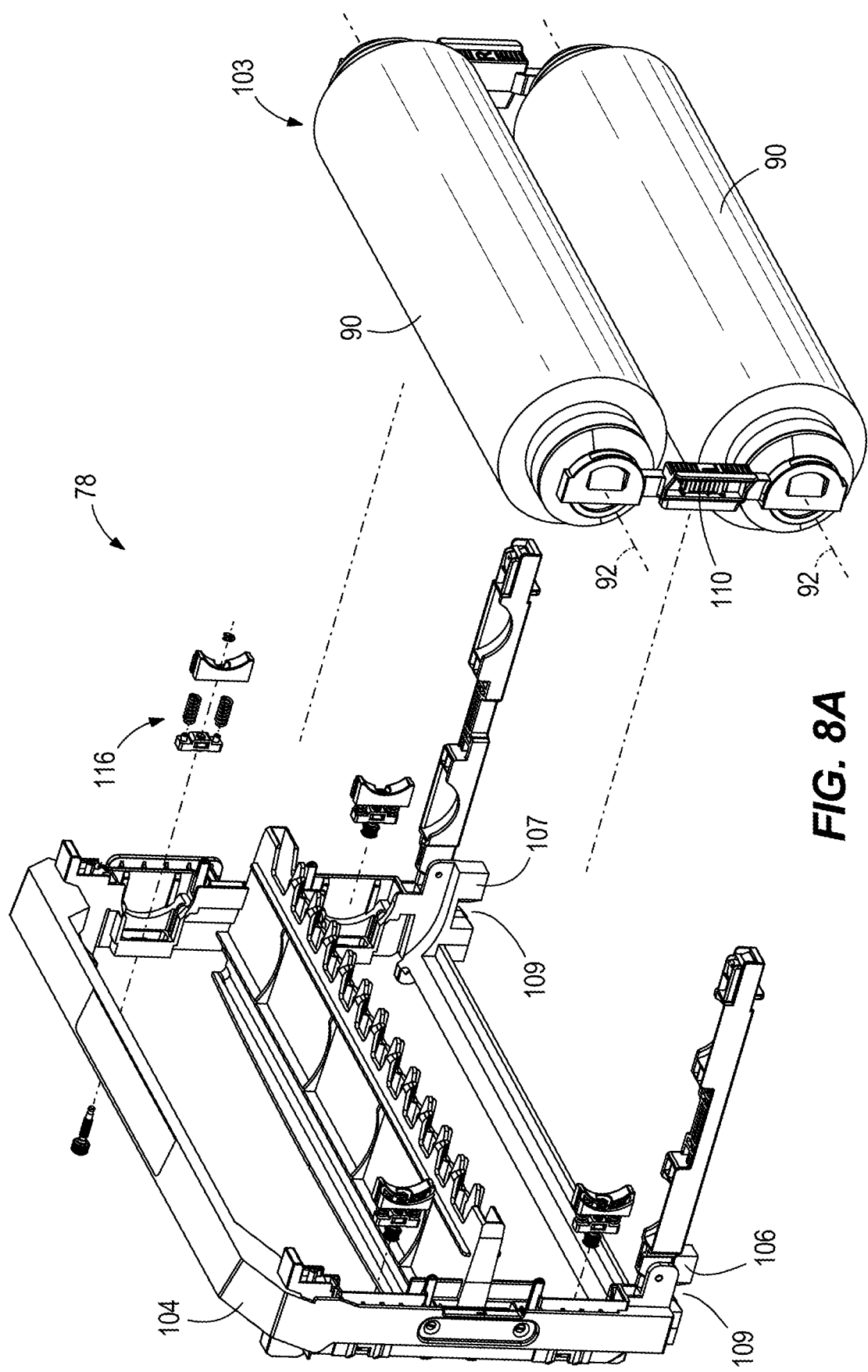
FIG. 8A is an exploded assembly view of the replaceable laminating film cartridge of FIG. 8.

With reference to FIGS. 8 and 8A, the replaceable laminating film cartridge 78 can include a removable refill portion 103 selectively securable to a reusable frame portion 104. The pressure-sensitive laminating film rolls 90 are provided as part of the removable refill portion 103, separate from the reusable frame portion 104. The first and second laminating film rolls 90 are connected together at a prescribed spacing distance by connector(s) that form a complementary fit with the interior of the reusable frame portion 104. Aspects of the laminating film cartridge 78 can be similar to that disclosed in U.S. Patent Application Publication No. 2022/0281709, the entire contents of which are incorporated by reference herein. The cartridge 78 includes a first end portion 106 and a second end portion 107 arranged on opposite ends of the laminating film rolls 90. The first end portion 106 and second end portion 107 have respective base ends formed with the respective open-bottom channels 109 that are aligned and configured to mutually receive the slide rail 80 provided at the bottom of the laminating film cartridge receptacle 74. Engagement with the slide rail 80 may limit the laminating film cartridge 78 to movement into and out of the operation position in the laminating film cartridge receptacle 74 by sliding movement parallel to the spool axes 92 (i.e., perpendicular to the laminating path 16).

The cartridge 78 includes a spring-loaded brake 116 configured to enable adjustment of the unrolling tension in one of the laminating film rolls 90. Adjusting the brake 116 changes the unrolling tension differential between the two rolls 90 to correct for curl in the finished laminated products. In some constructions, the system characteristics produce an inherent amount of product curling during operation. Although the brake 116 can offset or correct this inherent curling, additional or alternative solutions can be provided in the lamination unit 10. For example, the two laminating pressure rollers 66 can be manufactured with non-matching hardness and/or outside diameter. The difference in hardness and/or outside diameter may be relatively small, e.g., one roller's outside diameter being reduced by 10 percent or less compared to the other, or one roller's hardness on a common hardness scale being reduced by 10 percent or less compared to the other. Either or both of these solutions may reduce or completely offset the natural tendency for curl in finished laminated products. Thus, the tension brake 116 may be retained for fine adjustment or may be eliminated in some constructions.

Figure 12:
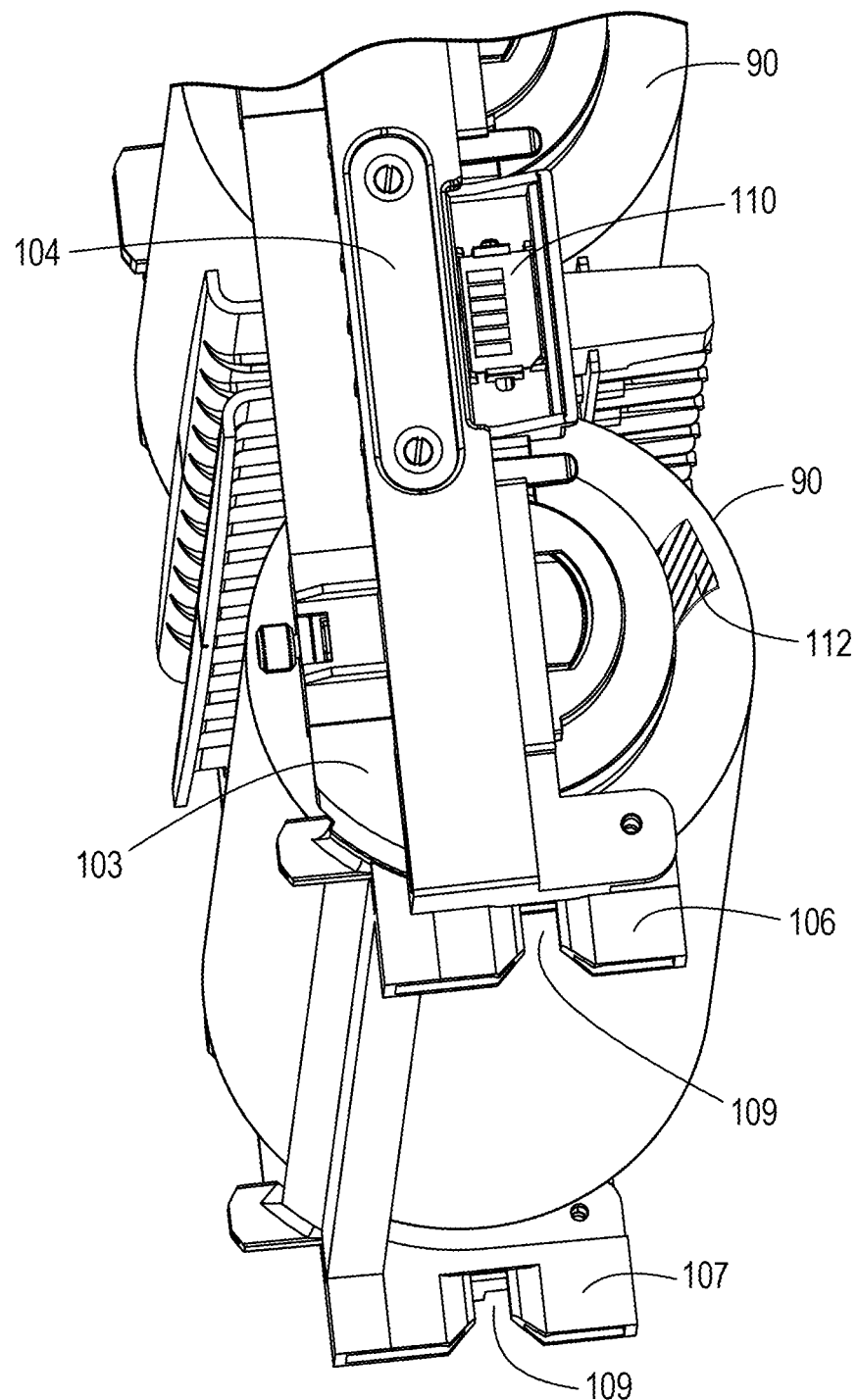
FIG. 12 is a perspective view of the replaceable laminating film cartridge roll, including a laminating film roll with an end of roll flag.

With further reference to FIGS. 8 and 12, the removable refill portion 103 includes an electronic memory device such as an EEPROM 110 operable to store information about the laminating film rolls 90, including any combination of its serial number, type, and remaining length. The EEPROM 110 may communicate with the controller 59 to alert the user of errors (e.g., an incompatibility between paper size/type and film size/type) and circumvent unsuccessful lamination jobs. The EEPROM 110 is provided on the removable refill portion 103 at a position that remains exposed when joined with the reusable frame portion 104 as shown in FIG. 8. As such, a connection for electrical communication can be established between the EEPROM 110 and the controller 59 (e.g., by a Serial Peripheral Interface "SPI" connector 111, including conductor contacts and spring pins) upon insertion of the laminating film cartridge 78 into the operational position within the receptacle 74. The connection for electrical communication can be automatic upon insertion of the laminating film cartridge 78, not requiring any further steps or actions. The connector 111 can be seen at the back of the lamination unit 10 in FIG. 3, as the cartridge 78 is removed from the lamination unit 10. The connector 111 is one exemplary means of sensing or transmitting information from the EEPROM 110 to the controller 59, although alternative sensing and/or communication devices and protocols are also contemplated.

The EEPROM 110 communicates with the controller 59 to allow tracking the laminating film usage by the controller 59. Supplied with data on the original film roll lengths of the cartridge 78 and data on the usage within the lamination unit 10, the controller 59 may calculate a remaining length of laminating film. The controller 59 is programmed for bi-directional communication with the EEPROM 110. The EEPROM 110 provides the laminating film information to the controller 59, and the controller 59 communicates back, continuously or periodically, to rewrite the EEPROM 110 with an updated value of remaining laminating film length. Thus, the calculated amount of remaining film from the controller 59 is stored with the cartridge 78 (particularly the refill portion 103). As such, the information is unaffected by removal and reinsertion of the film rolls 90. If removed and reinserted, into the same lamination unit 10 or another one like it, the controller 59 is configured to read the current remaining film length of the laminating film cartridge 78 as stored to the EEPROM 110 at the last usage prior to removal. The controller 59 can then continue to update the EEPROM 110 from an accurate starting point when the cartridge 78 is further used within the lamination unit 10.

The bi-directional communication between the EEPROM 110 and the controller 59 can be used to provide warnings to the users of the lamination unit 10—either at a local display on the lamination unit 10 or a display of the printing device 2. The warnings can inform a user of low amounts of laminating film and communicate if the cartridge 78 needs to be replaced soon. In some embodiments, the laminating controller 59 can communicate to the controller 3 of the printing system 1 such that the controller 3 can issue a warning based on the remaining laminating film length. For example, the warning may indicate that the requested number of sheets to be laminated cannot be completed without replenishing the laminating film (e.g., refilling the cartridge 78). In some cases, a laminating job (which may form a portion of an overall printing job) may be put on hold or aborted if insufficient film remains. The user may change the cartridge 78 prior to starting the print job, or the user may wait and replace mid-print when the laminating film is completely used up. Upon reaching a low film threshold, the controller 3 may trigger and maintain a low film warning until the cartridge 78 is replaced.

As illustrated in FIG. 12, at least one of the laminating film rolls 90 includes an end of roll flag 112 (e.g., adhesive flag or other indicator) at a designated distance from the end of the film, for example 3000 mm remaining or 1000 mm remaining. The end of roll flag 112 can be identified by a corresponding sensor 112A. The end of roll flag 112 is a physical factory-set indicator, as opposed to a calculated amount (from the controller 59), allowing a positive confirmation of an approaching end-of-roll. The end of roll flag 112 acts as a back-up or failsafe to the EEPROM 110. For example, upon detection of the end of roll flag 112 by the sensor 112A, the controller 59 is configured to overwrite a current remaining film length stored on the EEPROM 110 based on the preprogrammed value corresponding to the factory-set placement of the end of roll flag 112. This may overwrite a higher value of remaining film stored on the EEPROM 110 (e.g., when some unrecorded film waste introduces error in the calculated amount). In some constructions, a signal identifying the end of film supply (e.g., a prescribed number of rotations following identification of the end of roll flag 112 by the sensor 112A) causes the controller 59 to enact a hard stop for further laminating to prevent binding or jamming that may occur if the pressure rollers 66 attempt pulling the terminal end of laminating film off the supporting spool to which it is secured.

Figure 9:
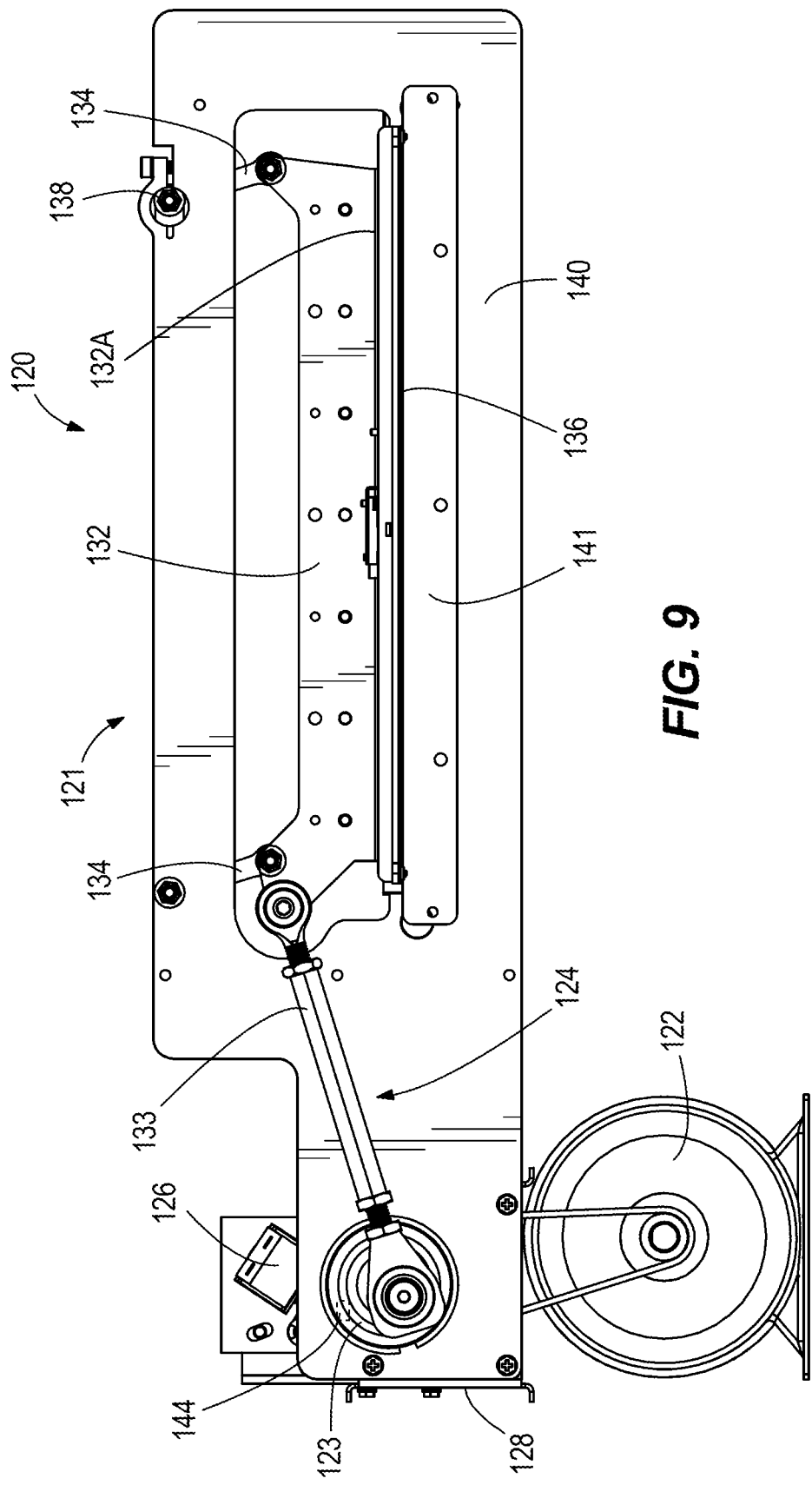
FIG. 9 is a front view of a cutter unit.

With reference to FIG. 9, the lamination unit 10 includes a cutter assembly 120, or simply "cutter," provided between the set of laminating pressure rollers 66 and the exit 17. In some constructions, the cutter 120 includes a guillotine cutter unit 121. The cutter 120 includes a cutting motor 122 operably connected to a clutch pulley 123 which couples to a drive link 124 and acts as a crank for the drive link 124. The clutch pulley 123 can be operated by a solenoid 126. The drive link 124 has an end opposite the clutch pulley 123 that is connected with a blade frame or blade arm 132 on which the cutting edge or blade 132A is provided. The sheet sensor 94 is disposed adjacent an inlet 128 of the cutter 120 and detects a trailing edge of the laminated sheet as it moves through the inlet 128 of the cutter 120. The sheet sensor 94 sends a signal to the controller 59, in response to which the controller sends a signal to activate the clutch pulley 123. Additional details and alternative triggers have been discussed in the preceding description with respect to determining when the laminated sheet is to be stopped for cutting. The drive link 124 is mechanically adjustable to adjust a cutting stroke of the blade arm 132 and blade 132A of the guillotine cutter unit 121. The drive link 124 has a length adjuster 133 (e.g., turnbuckle) operable to adjust the length of the drive link 124 and correspondingly adjust the cutting stroke. The blade 132 operates against a stationary cutting stick 136 on a base or frame 140 of the cutter 120. At certain times, such as the beginning of a new cartridge 78 or the beginning of a new job after a dormant period, waste film must be trimmed from a leading edge when commencing laminating. The trimming is accommodated by operation of the cutter 120, and disposal of the trimmed waste to a waste bin 142, for example through a purge gate 142A. The purge gate 142A can be solenoid-operated.

The cutter 120 further includes a plurality of support links 134 supporting the blade arm 132 from the frame 140. The blade arm 132 is configured to hover the blade 132A over the cutting stick 136 between cuts. One of the support links 134 is mechanically adjustable to adjust a cutting alignment of the blade arm 132 and the blade 132A in relation to the stationary cutting stick 136. For example, one of the support links 134 is coupled to the frame 140 via an eccentric bearing 138. The levelness of the blade arm 132 and the blade 132A is adjusted by adjusting (rotating) the bearing 138 within the frame 140. The bearing 138 can be clamped into the desired orientation once adjusted. The cutting stick 136 is worn down over time and is removably coupled to the frame 140 of the cutter 120 to be easily reconfigured and eventually replaced without impact to other portions of the cutter 120. The blade 132A is configured to contact the cutting stick 136 off-center such that the cutting stick 136 can be flipped around and reused in a second configuration to extend its useful life. The cutting stick 136 can also be flipped over such that the bottom becomes the top for a third configuration. From the third configuration, the cutting stick 136 can be flipped around for a fourth configuration. The cutting stick 136 is removed by uncoupling mechanical fasteners and removing a removable baffle 141 with the cutting stick 136. The cutting stick 136 is removed and reconfigured or a new one is installed. In some embodiments, the cutting stick 136 is made of plastic, but may be made of other suitable materials. Furthermore, the cutter 120 facilitates replacement of the cutting stick 136 to a different material. A second blade sensor 144, as illustrated in FIG. 9, is encased in a disk coupled to the clutch pulley 123. The second blade sensor 144 rotates with the clutch pulley 123 to track the movement of the blade arm 132 with the blade 132A to ensure it returns to a home position before allowing the next laminated product to enter the cutter 120. Once the laminated product is cut, it leaves the lamination unit 10 through the exit 17 and onto an output tray for retrieval.

Figure 9A:
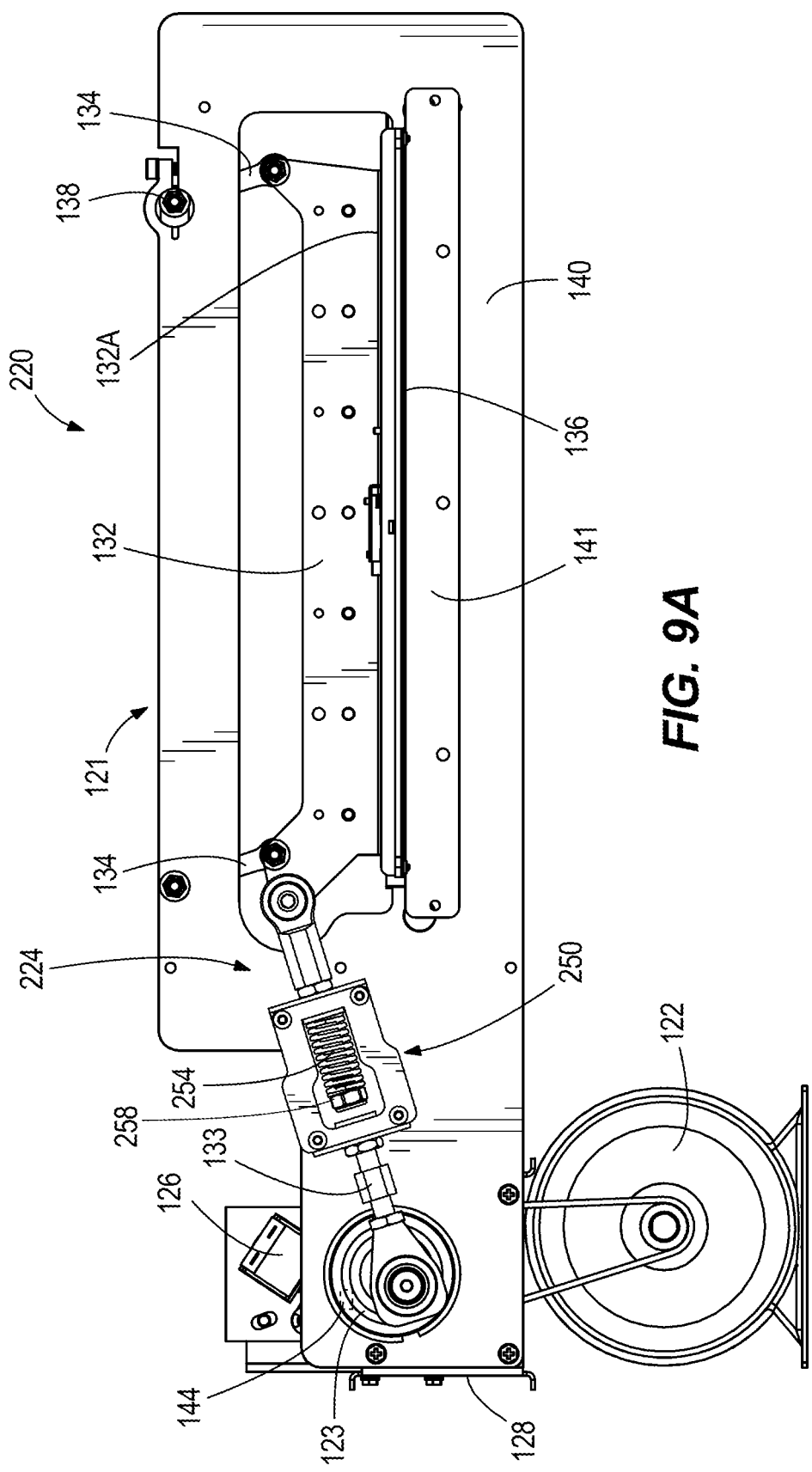
FIG. 9A is a front view of a cutter unit according to another embodiment.

FIG. 9A illustrates a cutter 220 of another construction, which is generally similar to the cutter 120 except as specifically noted below. Therefore, reference numbers from FIG. 9 are retained where appropriate and reference is made to the above description. The cutter 220 includes a drive link 224 connecting the clutch pulley 123 to the blade arm 132. The drive link 224 may be mechanically adjustable with a length adjuster 133 to adjust a cutting stroke of the blade arm 132 and blade 132A of the guillotine cutter unit 121, like that of FIG. 9. However, the drive link 224 of FIG. 9A is also provided with an integrated compensator 250 that allows elastic flexure within the drive link 224. Thus, reliable cutting may be achieved with less adjustment of the drive link length or the eccentric bearing 138, either or both of which may optionally be eliminated or provided with a smaller range of adjustment as compared to FIG. 9. The compensator 250 can include a spring 254, which is shown as a compression coil spring in the illustrated embodiment. The spring 254 is operable to deflect and store energy from any additional drive input from the clutch pulley 123 after the blade 132A makes contact with the cutting stick 136. The preload in the spring 254 is adjustable in some configurations, for example, by a nut 258 on a threaded shaft about which the spring 254 is disposed.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. Various features of the invention are set forth in the following claims.

What is claimed is:

1. A high-speed cold laminating system comprising:
   a lamination unit configured for inline use connected with a paper feeder, the lamination unit having an entrance configured to receive a plurality of individual paper sheets provided in a continuous stream from the paper feeder at a page rate of at least 30 pages per minute, the lamination unit further including an exit, a set of unheated laminating pressure rollers along a laminating path between the entrance and the exit, and a cutter provided between the set of laminating pressure rollers and the exit;
   a motor connected to drive rotation of the set of laminating pressure rollers;
   a diverter gate operable between a first position that passes sheets of the plurality of individual paper sheets to the laminating path, and a second position that passes sheets of the plurality of individual paper sheets to the exit without passing along the laminating path; and
   a controller operably connected to control the motor, the diverter gate, and a plurality of functions of the lamination unit,
   wherein the controller is programmed to control the motor to pause the set of pressure rollers with a leading sheet of the plurality of individual paper sheets therein while a subsequent sheet of the plurality of individual paper sheets is conveyed along the laminating path toward the set of laminating pressure rollers so that a laminated spacing distance between a trailing edge of the leading sheet and a leading edge of the subsequent sheet is equal to a prescribed spacing distance.

2. The high-speed cold laminating system of claim 1, wherein the prescribed spacing distance is double a prescribed border value input to the controller so as to avoid trimming and waste between the laminated leading sheet and subsequent sheet.

3. The high-speed cold laminating system of claim 1, further comprising a steering module upstream of the set of laminating rollers along the laminating path, the steering module operable to orient and position each one of the individual paper sheets with respect to a directional path through the lamination unit.

4. The high-speed cold laminating system of claim 1, wherein the lamination unit includes a laminating film cartridge receptacle directly upstream of the set of laminating pressure rollers, the laminating film cartridge receptacle accommodating a replaceable laminating film cartridge with two continuous rolls of pressure-sensitive laminating film positioned along parallel spool axes.

5. The high-speed cold laminating system of claim 4, wherein the laminating film cartridge is movable into and out of an operation position in the laminating film cartridge receptacle by sliding movement parallel to the spool axes.

6. The high-speed cold laminating system of claim 1, wherein the cutter comprises a crank-driven reciprocating guillotine cutter assembly positioned downstream of the set of pressure rollers.

7. The high-speed cold laminating system of claim 6, wherein the guillotine cutter assembly includes a drive link that is mechanically adjustable to adjust a cutting stroke of a blade of the guillotine cutter assembly, and wherein the guillotine cutter assembly includes a support link that is mechanically adjustable to adjust a cutting alignment of the blade in relation to a stationary cutting stick.

8. The high-speed cold laminating system of claim 7, wherein the cutting stick is removably coupled to a frame of the guillotine cutter assembly to facilitate reconfiguration and/or replacement of the cutting stick.

9. The high-speed cold laminating system of claim 6, wherein the guillotine cutter assembly includes a drive link with an integrated compensator operable to absorb excess input travel to a blade of the guillotine cutter assembly.

10. The high-speed cold laminating system of claim 1, wherein the controller is configured to change a line speed of sheets of the continuous stream of paper sheets between the entrance and the set of laminating pressure rollers and to change a line speed of the sheets, after lamination, between the set of laminating pressure rollers and the exit such that the controller can maintain an overall page rate through the lamination unit that matches the page rate at the entrance, up to at least 90 pages per minute, without driving the motor at a speed that matches the page rate.

* * * * *